United States Patent
Li et al.

(10) Patent No.: US 11,784,312 B1
(45) Date of Patent: Oct. 10, 2023

(54) CURRENT COLLECTOR AND PREPARATION METHOD THEREOF, SECONDARY BATTERY, BATTERY MODULE, BATTERY PACK, AND ELECTRIC APPARATUS

(71) Applicant: CONTEMPORARY AMPEREX TECHNOLOGY CO., LIMITED, Ningde (CN)

(72) Inventors: Mingling Li, Ningde (CN); Jia Peng, Ningde (CN); Xin Liu, Ningde (CN); Cheng Li, Ningde (CN); Xianghui Liu, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/963,140

(22) Filed: Oct. 10, 2022

Related U.S. Application Data

(63) Continuation of application No. PCT/CN2021/129459, filed on Nov. 9, 2021.

(51) Int. Cl.
*H01M 4/62* (2006.01)
*H01M 4/66* (2006.01)

(52) U.S. Cl.
CPC ........... *H01M 4/622* (2013.01); *H01M 4/661* (2013.01)

(58) Field of Classification Search
None
See application file for complete search history.

(56) References Cited

U.S. PATENT DOCUMENTS

| 2013/0209889 A1* | 8/2013 | Takahata | H01M 4/668 29/623.5 |
| 2016/0126557 A1* | 5/2016 | Kataoka | H01M 4/667 429/231.95 |

FOREIGN PATENT DOCUMENTS

| CN | 107895765 A | 4/2018 |
| CN | 111048790 A | 4/2020 |

(Continued)

OTHER PUBLICATIONS

CN11348861A—machine translation (Year: 2021).*

(Continued)

*Primary Examiner* — Haroon S. Sheikh
(74) *Attorney, Agent, or Firm* — Kilpatrick Townsend & Stockton LLP

(57) ABSTRACT

This application provides a current collector and a preparation method thereof, a secondary battery containing such current collector, a battery module, a battery pack, and an electric apparatus. The current collector in this application includes a support layer, a binder layer, and a metal layer, where the binder layer is arranged between the support layer and the metal layer, the binder layer includes an organic binder and inorganic particles, a thickness $D_0$ of the binder layer is 1.0-5.0 μm, optionally 1.0-3.0 μm; and the inorganic particles include large particles with a median particle size $D_{50large}$ and small particles with a median particle size $D_{50small}$, and the median particle sizes of the large particles and the small particles satisfy the following relationships: $D_{50large} > D_{50small}$; $D_{50large} = (0.5\text{-}0.9) \times D_0$; and $D_{50small} = (0.1\text{-}0.4) \times D_0$.

13 Claims, 6 Drawing Sheets

(56) References Cited

FOREIGN PATENT DOCUMENTS

| | | |
|---|---|---|
| CN | 113394406 A | 9/2021 |
| CN | 113488661 A | 10/2021 |

OTHER PUBLICATIONS

Contemporary Amperex Technology Co., Limited, International Search Report and Written Opinion, PCT/CN2021/129459, dated May 27, 2022, 15 pgs.

* cited by examiner

5

CURRENT COLLECTOR AND PREPARATION METHOD THEREOF, SECONDARY BATTERY, BATTERY MODULE, BATTERY PACK, AND ELECTRIC APPARATUS

CROSS-REFERENCE TO RELATED APPLICATIONS

This application is a continuation application of PCT Patent Application No. PCT/CN2021/129459, entitled "CURRENT COLLECTOR AND PREPARATION METHOD THEREOF, SECONDARY BATTERY, BATTERY MODULE, BATTERY PACK, AND ELECTRIC APPARATUS" filed on Nov. 9, 2021, which is incorporated herein by reference in its entirety.

TECHNICAL FIELD

This application relates to the field of secondary battery technologies, and in particular, to a current collector, a preparation method of the current collector, a secondary battery containing such current collector, a battery module, a battery pack, and an electric apparatus.

BACKGROUND

In recent years, with increasingly wide application of lithium-ion batteries, the lithium-ion batteries are widely used in energy storage power supply systems such as water power stations, thermal power stations, wind power stations, and solar power stations, and in a plurality of fields such as electric tools, electric bicycles, electric motorcycles, electric vehicles, military equipment, and aerospace. Due to great development of the lithium-ion batteries, higher requirements are imposed on energy density, cycling performance, safety performance, and the like of the lithium-ion batteries.

In the prior art, composite current collectors with a three-layer structure of metal layer-support layer-metal layer have been used to improve energy density and safety performance of batteries. The composite current collector with the three-layer structure of metal layer-support layer-metal layer has thinned metal layers to significantly improve energy density. In addition, the thinned metal layers help improve safety performance of the battery cell, and the support layer in the middle implements thermal shrinkage during thermal runaway, helping alleviate the thermal runaway. However, during cold pressing, an electrode plate including a composite current collector with such structure extends much farther than that including a conventional current collector, and the electrode plate is prone to deformation during cold pressing, leading to cold-pressing strip breakage and electrode plate wrinkling. During use of a battery cell including such electrode plate, under action of cyclic swelling force, the electrode plate near a transfer welding position is easily wrinkled, which deteriorates performance of the battery cell. In addition, the support layer extends farther than the metal layer, and therefore the support layer easily peels off the metal layer, which consequently leads to poor processing performance of the composite current collector. Also, the composite current collector is likely to have burrs on an interface between the metal layer and the support layer during cutting, and the metal layer falls off after soaking in an electrolyte, which brings about safety issues and battery cell performance issues.

In view of this, in the prior art, an organic binder layer is used between the metal layer and the support layer to improve adhesion of the composite current collector, to resolve the problem of cutting burrs and the like. However, in the composite current collector with the organic binder layer, the metal layer is directly attached to an organic binder layer with very low elastic modulus, which leads to a significant decrease in elastic modulus of the current collector and further leads to excessively large elongation of the electrode plate including the composite current collector during cold pressing. This cannot resolve the problems of cold-pressing strip breakage, electrode plate wrinkling, and the like, and it is hard to avoid peeling between the metal layer and the support layer.

Therefore, the composite current collector in the prior art still needs to be improved to achieve sufficient adhesion and significantly increased elastic modulus.

SUMMARY

In view of the foregoing problems described in the Background, this application aims to provide a composite current collector with both sufficient adhesion and significantly increased elastic modulus, so as to improve processing performance of composite current collectors and improve safety performance and long-term stability of batteries using such composite current collectors.

In order to achieve the above objectives, according to a first aspect, this application provides a current collector, including:

a support layer;
a binder layer; and
a metal layer, where
the binder layer is arranged between the support layer and the metal layer;
the binder layer includes an organic binder and inorganic particles;
a thickness $D_0$ of the binder layer is 1.0-5.0 μm, optionally 1.0-3.0 μm; and
the inorganic particles include large particles with a median particle size $D_{50large}$ and small particles with a median particle size $D_{50small}$, and the median particle sizes of the large particles and the small particles satisfy the following relationships:

$$D_{50large} > D_{50small};$$

$$D_{50large} = (0.5\text{-}0.9) \times D_0; \text{ and}$$

$$D_{50small} = (0.1\text{-}0.4) \times D_0.$$

Therefore, in this application, the binder layer including the organic binder and the inorganic particles is arranged between the support layer and the metal layer that are of the current collector, and the thickness of the binder layer and the particle size of the inorganic particles can be better matched, so that an interface between the metal layer and the support layer is optimized and adhesion is also improved. This resolves the problems of wrinkling of electrode plate, arcing, and strip breakage during cold pressing of the current collector, thereby improving kinetic performance of batteries using such current collectors. In addition, an elastic modulus of the current collector is increased, which reduces a cold-pressing elongation rate of the current collector, and further resolves the problems of wrinkling of electrode plate, arcing, and strip breakage during cold pressing of the current collector. Therefore, the foregoing disposition in this application greatly improves processing performance of the current collector, and also greatly improves safety performance and long-term stability of batteries using such current collectors.

In any embodiment, a mass percentage of the inorganic particles is 50 wt % to 85 wt %, optionally, 60 wt % to 80 wt %.

In any embodiment, based on a total mass of the inorganic particles, a mass percentage of the large particles is 70 wt % to 90 wt % and a mass percentage of the small particles is 10 wt % to 30 wt %.

In any embodiment, a median particle size $D_{50large}$ of the large particles is 700-4500 nm; and/or a median particle size $D_{50small}$ of the small particles is 100-2000 nm.

In any embodiment, the binder layer further includes carbon nanotubes, optionally, relative to the total mass of the binder layer, a mass percentage of the carbon nanotubes is less than or equal to 10%.

In any embodiment, the inorganic particles are selected from one or more of aluminum oxide, silicon carbide, silicon nitride, silicon oxide, calcium oxide, boehmite, titanium dioxide, zirconium dioxide, magnesium oxide, zinc oxide, barium sulfate, and boron carbide, and more optionally, are aluminum oxide.

In any embodiment, the support layer includes one or more of polyamide, polyimide, polyethylene glycol terephthalate, polybutylene terephthalate, polyethylene naphthalate, polycarbonate, polyethylene, polypropylene, polypropylene ethylene, acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene oxide, polyphenylene sulfide, polyethylene glycol, polythiaxyl, polyphenyl, polypyrrole, polyaniline, polythiophene, polypyridine, cellulose, starch, protein, epoxy resin, phenolic resin, derivatives thereof, crosslinked products thereof, and copolymers thereof.

In any embodiment, the organic binder is selected from one or more of polypropylene, carboxymethyl cellulose, polyacrylate, styrene-butadiene rubber, polyacrylic acid sodium, polyurethane, Polyethyleneimine, polyvinylidene fluoride, neoprene, nitrile rubber, silicone rubber, polyvinyl acetate, urea-formaldehyde resin, phenolic resin, epoxy resin, silane coupling agent, titanate coupling agent, zirconium coupling agent, aluminate coupling agent, and borate coupling agent; optionally, is one or more of polyurethane and polyacrylate; and more optionally, is polyurethane.

In any embodiment, the metal layer is an aluminum foil or a copper foil.

According to a second aspect, this application provides a preparation method of current collector, including:
providing a support layer;
dispersing inorganic particles and an organic binder uniformly in a solvent to prepare a slurry for forming a binder layer;
applying the slurry on one surface of the support layer to form a coating layer for forming the binder layer;
pre-baking the coating layer;
providing a metal layer on a pre-baked coating layer to form a laminate for forming a current collector;
pressing the laminate at high temperature, and performing curing after pressing; and
forming a current collector with a binder layer provided between the support layer and the metal layer; where optionally, physical or chemical etching is performed on a surface of the metal layer of the current collector to make the metal layer thinner;
a thickness $D_0$ of the binder layer is 1.0-5.0 μm, optionally 1.0-3.0 μm; and
the inorganic particles include large particles with a median particle size $D_{50large}$ and small particles with a median particle size $D_{50small}$, and the median particle sizes of the large particles and the small particles satisfy the following relationships:

$$D_{50large} > D_{50small};$$

$$D_{50large} = (0.5-0.9) \times D_0; \text{ and}$$

$$D_{50small} = (0.1-0.4) \times D_0.$$

According to a third aspect, this application provides a preparation method of current collector, including:
providing a metal layer;
dispersing inorganic particles and an organic binder uniformly in a solvent to prepare a slurry for forming a binder layer;
applying the slurry on one surface of the metal layer to form a coating layer for forming the binder layer;
pre-baking the coating layer;
providing a support layer on a pre-baked coating layer to form a laminate for forming a current collector;
pressing the laminate at high temperature, and performing curing after pressing; and
forming a current collector with a binder layer provided between the support layer and the metal layer; where optionally, physical or chemical etching is performed on a surface of the metal layer of the current collector to make the metal layer thinner;
a thickness $D_0$ of the binder layer is 1.0-5.0 μm, optionally 1.0-3.0 μm; and
the inorganic particles include large particles with a median particle size $D_{50large}$ and small particles with a median particle size $D_{50small}$, and the median particle sizes of the large particles and the small particles satisfy the following relationships:

$$D_{50large} > D_{50small};$$

$$D_{50large} = (0.5-0.9) \times D_0; \text{ and}$$

$$D_{50small} = (0.1-0.4) \times D_0.$$

In any embodiment, carbon nanotubes along with the inorganic particles and the organic binder are uniformly dispersed in a solvent.

In any embodiment, the pre-baking is performed at a temperature of 50-90° C.

In any embodiment, the pressing is performed at a temperature 5-20° C. lower than a melting point of the organic binder; optionally, the pressing is performed under a pressure above 30 T.

According to a fourth aspect, this application provides a secondary battery, including:
a positive electrode;
a negative electrode;
an electrolyte; and
a separator, where at least one of the positive electrode and the negative electrode includes the current collector according to the first aspect of this application.

According to a fifth aspect, this application provides a battery module. The battery module includes the secondary battery in the fourth aspect of this application.

According to a sixth aspect, this application provides a battery pack, including the battery module in the fifth aspect of this application.

According to a seventh aspect, this application provides an electric apparatus. The electric apparatus includes at least one of the secondary battery in the fourth aspect of this application, the battery module in the fifth aspect of this application, or the battery pack in the sixth aspect of this application.

In the current collector of this application, the inorganic particles with large particles and small particles are added to the binder layer provided between the support layer and the metal layer, which can increase both the adhesion of the current collector and the elastic modulus of the current collector, thereby improving processing performance of the current collector and also improving safety performance and long-term stability of batteries using such current collectors. The current collector in this application can implement a discharge internal resistance (DCR) equivalent to a discharge internal resistance (DCR) of a metal current collector.

Figure 1:
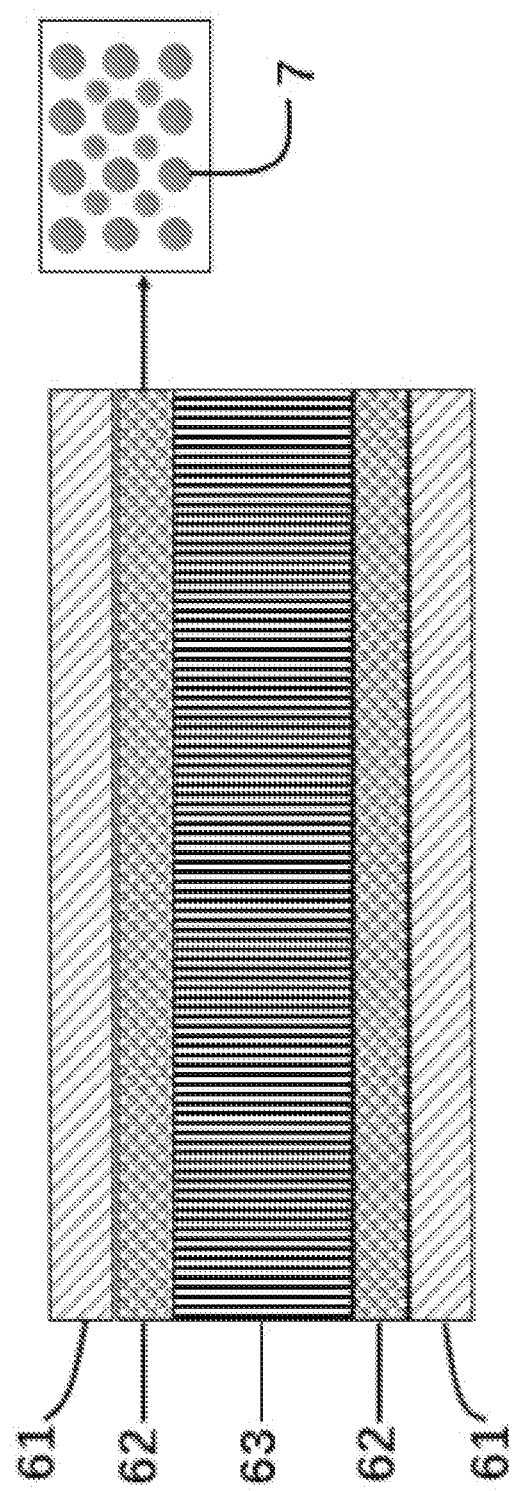
FIG. 1 is a schematic diagram of a current collector according to an embodiment of this application.

Reference signs are described as follows:

1: battery pack;
2: upper box body;
3: lower box body;
4: battery module;
5: secondary battery;
51: housing;
52: electrode assembly;
53: top cover assembly;
6: current collector;
61: metal layer;
62: binder layer;
63: support layer; and
7: inorganic particles.

DESCRIPTION OF EMBODIMENTS

The following specifically discloses embodiments of a current collector and a preparation method thereof, a secondary battery, a battery module, a battery pack, and an electric apparatus in this application with appropriate reference to detailed descriptions of accompanying drawings. However, unnecessary detailed descriptions may be omitted. For example, detailed descriptions of a well-known matter or overlapping descriptions of an actual identical structure has been omitted. This is to avoid unnecessary cumbersomeness of the following descriptions, to facilitate understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in the method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if low limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, when a parameter is expressed as an integer greater than or equal to 2, it is equivalent to disclose that the parameter is, for example, an integer 2, 3, 4, 5, 6, 7, 8, 9, 10, 11, 12, or the like.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, all the steps in this application can be performed sequentially or randomly, or preferably, is performed sequentially. For example, a method including steps (a) and (b) indicates that the method may include steps (a) and (b) performed in sequence, or may include steps (b) and (a) performed in sequence. For example, the foregoing method may further include step (c), which indicates that step (c) may be added to the method in any order, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, terms "include" and "contain" may mean that other unlisted components may also be included or contained, or only listed components may be included or contained.

Unless otherwise specified, in this application, the term "or" is inclusive. For example, the phrase "A or B" means "A, B, or both A and B". More specifically, any of the following conditions satisfies the condition "A or B": A is true (or present) and B is false (or not present); A is false (or not present) and B is true (or present); or both A and B are true (or present).

In this application, median particle size indicates a particle size corresponding to a cumulative volume distribution percentage of the inorganic particles reaching 50%. In this application, a median particle size $D_{50}$ of the inorganic particles may be measured by using a particle size distribution laser diffraction method. For example, according to the standard GB/T 19077-2016, a laser particle size analyzer (for example, Malvern Master Size 3000) is used for measurement.

This application provides a current collector, including:
a support layer;
a binder layer; and
a metal layer, where
the binder layer is arranged between the support layer and the metal layer;

the binder layer includes an organic binder and inorganic particles;

a thickness $D_0$ of the binder layer is 1.0-5.0 µm, optionally 1.0-3.0 µm; and the inorganic particles include large particles with a median particle size $D_{50large}$ and small particles with a median particle size $D_{50small}$, and the median particle sizes of the large particles and the small particles satisfy the following relationships:

$D_{50large} > D_{50small}$;

$D_{50large} = (0.5\text{-}0.9) \times D_0$; and $D_{50small} = (0.1\text{-}0.4) \times D_0$.

Although the mechanism is not yet clear, the applicant unexpectedly found that, in this application, with the binder layer including the organic binder and inorganic particles disposed between the support layer and the metal layer, the adhesion between the metal layer and the support layer is significantly improved, so that the metal layer may not fall off even after rolling, soaking in electrolyte, and long-term cycling of the current collector, thereby improving long-term stability of batteries including such current collectors. In addition, a binder layer with a specific thickness greatly improves an interface between the metal layer and the support layer, and resolves the problem of burrs during substrate cutting, thereby improving safety performance of battery cells.

In this application, as shown in FIG. 1, the inorganic particles with large particles and small particles are added to the binder layer, which can increase an elastic modulus of the binder layer. In addition, the thickness of the binder layer and the particle size of the inorganic particles can be better matched, to increase an elastic modulus of the composite current collector. This resolves the problems such as wrinkling of electrode plate, arcing, and strip breakage during cold pressing of composite current collectors in the prior art, and greatly improves processing performance of current collectors.

Specifically, in this application, dispersibility of the inorganic particles can be ensured by controlling the particle size of the inorganic particles included in the binder layer, thereby effectively increasing elastic modulus of both the binder layer and the current collector. If the inorganic particles are excessively small, it is difficult to sufficiently achieve the effects of increasing the elastic modulus. If the inorganic particles are excessively large, dispersibility may become poorer, and bumps may locally occur after cold pressing of the current collector. In this application, the inorganic particles include large particles with a median particle size $D_{50large}$ and small particles with a median particle size $D_{50small}$ ($D_{50large} > D_{50small}$). If the inorganic particles include only small particles, slippage between particles may easily occur; if the inorganic particles include only large particles, many voids may be present in the binder layer and are difficult to fill, both consequently affecting improvement of the elastic modulus. In this application, large particles of appropriate size are used along with small particles of appropriate size, and the thickness $D_0$ of the binder layer and median particle sizes of the large particles and the small particles satisfy the relationships: $D_{50large} = (0.5\text{-}0.9) \times D_0$ and $D_{50small} = (0.1\text{-}0.4) \times D_0$. In this way, the thickness of the binder layer and the particle size of the inorganic particles can be better matched, to fully achieve the effect of increasing the elastic modulus by the inorganic particles in the binder layer.

Therefore, the current collector in this application has a significantly increased elastic modulus, and a cold-pressing elongation rate is greatly reduced during cold pressing, which reduces the risk of peeling between the metal layer and the support layer after cold pressing, reduces the number of times of cold-pressing strip breakage, and reduces an elongation difference (an arc height of the cold-pressed electrode plate) between an active material region and a tab region of the electrode plate using such current collector. This solves the problems of wrinkling of electrode plate and strip breakage, greatly improves processing performance of current collectors during manufacturing of secondary batteries, and greatly improves kinetic performance of secondary batteries using such current collectors.

In this application, the thickness $D_0$ of the binder layer is 1.0-5.0 µm, optionally 1.0-3.0 µm. When a binder layer having a thickness within the foregoing specified range is used, the effect of increasing the elastic modulus of the inorganic particles in the binder layer can be fully guaranteed. When the thickness of the binder layer is excessively small, it is difficult to apply the binder layer uniformly, resulting in uneven bonding between the metal layer and the support layer, and there may be gaps or air bubbles in the interface layer, which reduces adhesion of the current collector and adversely affects the elastic modulus of the current collector. When the thickness of the binder layer is excessively large, sedimentation of inorganic particles and uneven distribution of particles may occur when the binder layer is being applied, which adversely affects the adhesion and elastic modulus of the current collector. Also, the binder layer having a thickness within the specified range can effectively suppress an undesired increase in discharge internal resistance. The discharge internal resistance (DCR) of the battery using the current collector of this application is equivalent to a discharge internal resistance (DCR) of a battery using a metal layer as a current collector, thereby effectively suppressing temperature increase during use of batteries and improving the cycle life and safety performance of batteries.

In some embodiments, based on a total mass of the binder layer, a mass percentage of the inorganic particles is 50 wt % to 85 wt %, optionally 60 wt % to 80 wt %. In this application, adding the inorganic particles to the binder layer of the current collector can increase the elastic modulus of the binder layer, thereby increasing the elastic modulus of the current collector. When the mass percentage of the inorganic particles in the binder layer is excessively low, the effect of increasing the elastic modulus may not be fully achieved; when the mass percentage of inorganic particles in the binder layer is excessively high, the adhesion of the current collector may be reduced, adversely affecting properties of the interface between the metal layer and the support layer.

In some embodiments, based on a total mass of the inorganic particles, a mass percentage of the large particles is 70 wt % to 90 wt % and a mass percentage of the small particles is 10 wt % to 30 wt %. In this application, combination of the large particles and the small particles in the inorganic particles fully achieves the effect of increasing the elastic modulus by the inorganic particles. When the mass percentage of the large particles in the inorganic particles is excessively low and the mass percentage of the small particles in the inorganic particles is excessively high, it may be difficult to suppress slippage between particles in the binder layer. When the mass percentage of the large particles in the inorganic particles is excessively high and the mass percentage of the small particles in the inorganic particles is excessively low, it may be difficult to fully fill voids in the binder layer, which consequently adversely affect the effect of increasing the elastic modulus.

In some embodiments, the median particle size $D_{50large}$ of the large particles may be 700-4500 nm. When the particle size of the large particles is excessively large, dispersibility of the particles may become poorer; when the particle size of the large particles is excessively small, it may be difficult to suppress slippage between particles in the binder layer. Optionally, the median particle size $D_{50small}$ of the small particles may be 100-2000 nm. When the particle size of the small particles is excessively large, it may be difficult to adequately fill voids in the binder layer; when the particle size of the small particles is excessively small, slippage between particles may easily occur in the binder layer, resulting in a non-ideal effect of increasing the elastic modulus.

In some embodiments, the binder layer may further include carbon nanotubes. The carbon nanotubes can play the role of filling gaps between the inorganic particles, thereby further increasing the elastic modulus of the current collector. Optionally, relative to the total mass of the binder layer, a mass percentage of the carbon nanotubes may be less than or equal to 10%. When the mass percentage of carbon nanotubes in the binder layer exceeds 10%, the elastic modulus of the current collector is difficult to keep increasing along with increasing carbon nanotubes, which may adversely affect the adhesion of the current collector.

In some embodiments, the inorganic particles are selected from one or more of aluminum oxide, silicon carbide, silicon nitride, silicon oxide, boehmite, titanium dioxide, zirconium dioxide, magnesium oxide, zinc oxide, barium sulfate, and boron carbide. In this application, the inorganic particles with the particle size falling within the specified range can fully play the effect of increasing the elastic modulus, and therefore a material of the inorganic particles is not particularly limited. As a non-limiting example, the inorganic particles may be aluminum oxide.

In some embodiments, the support layer includes one or more of polyamide, polyimide, polyethylene glycol terephthalate, polybutylene terephthalate, polyethylene naphthalate, polycarbonate, polyethylene, polypropylene, polypropylene ethylene, acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene oxide, polyphenylene sulfide, polyethylene glycol, polythiaxyl, polyphenyl, polypyrrole, polyaniline, polythiophene, polypyridine, cellulose, starch, protein, epoxy resin, phenolic resin, derivatives thereof, crosslinked products thereof, and copolymers thereof. In this application, disposition of the support layer can reduce the thickness of the metal layer, which helps improve safety performance of the battery. Moreover, in case of thermal runaway, thermal shrinkage of the support layer can also reduce or eliminate adverse effects of thermal runaway. Therefore, a material of the support layer is not particularly limited provided that the foregoing effects can be achieved.

In some embodiments, the organic binder is selected from one or more of polypropylene, carboxymethyl cellulose, polyacrylate, styrene-butadiene rubber, polyacrylic acid sodium, polyurethane, Polyethyleneimine, polyvinylidene fluoride, neoprene, nitrile rubber, silicone rubber, polyvinyl acetate, urea-formaldehyde resin, phenolic resin, epoxy resin, silane coupling agent, titanate coupling agent, zirconium coupling agent, aluminate coupling agent, and borate coupling agent. In this application, provided that the organic binder can improve the adhesion between the metal layer and the support layer, there is no limitation in terms of materials. For example, the organic binder may be selected from one or more of polyurethane and polyacrylate; and more optionally, is polyurethane.

In some embodiments, the metal layer is an aluminum foil or a copper foil. It should be noted that the current collector of this application can be applied to a positive electrode current collector and also a negative electrode current collector in a secondary battery. When the current collector of this application is used as the positive electrode current collector of the secondary battery, the metal layer may be an aluminum foil. When the current collector of this application is used as the negative electrode current collector of the secondary battery, the metal layer may be a copper foil.

This application further provides a preparation method of current collector, including:

providing a support layer;

dispersing inorganic particles and an organic binder uniformly in a solvent to prepare a slurry for forming a binder layer;

applying the slurry on one surface of the support layer to form a coating layer for forming the binder layer;

pre-baking the coating layer;

providing a metal layer on a pre-baked coating layer to form a laminate for forming a current collector;

pressing the laminate at high temperature, and performing curing after pressing; and forming a current collector with a binder layer provided between the support layer and the metal layer; where optionally, physical or chemical etching is performed on a surface of the metal layer of the current collector to make the metal layer thinner;

a thickness $D_0$ of the binder layer is 1.0-5.0 μm, optionally 1.0-3.0 μm; and the inorganic particles include large particles with a median particle size $D_{50large}$ and small particles with a median particle size $D_{50small}$, and the median particle sizes of the large particles and the small particles satisfy the following relationships:

$$D_{50large} > D_{50small};$$

$$D_{50large} = (0.5\text{-}0.9) \times D_0; \text{ and}$$

$$D_{50small} = (0.1\text{-}0.4) \times D_0.$$

This application provides a preparation method of current collector, including:

providing a metal layer;

dispersing inorganic particles and an organic binder uniformly in a solvent to prepare a slurry for forming a binder layer;

applying the slurry on one surface of the metal layer to form a coating layer for forming the binder layer;

pre-baking the coating layer;

providing a support layer on a pre-baked coating layer to form a laminate for forming a current collector;

pressing the laminate at high temperature, and performing curing after pressing; and forming a current collector with a binder layer provided between the support layer and the metal layer; where optionally, physical or chemical etching is performed on a surface of the metal layer of the current collector to make the metal layer thinner;

a thickness $D_0$ of the binder layer is 1.0-5.0 μm, optionally 1.0-3.0 μm; and the inorganic particles include large particles with a median particle size $D_{50large}$ and small particles with a median particle size $D_{50small}$, and the median particle sizes of the large particles and the small particles satisfy the following relationships:

$$D_{50large} > D_{50small};$$

$$D_{50large} = (0.5-0.9) \times D_0; \text{ and}$$

$$D_{50small} = (0.1-0.4) \times D_0.$$

In the preparation method of this application, the current collector in the foregoing embodiment of this application can be effectively prepared.

In some embodiments, carbon nanotubes along with the inorganic particles and the organic binder may be uniformly dispersed in a solvent.

In some embodiments, the pre-baking may be performed at a temperature of 50-90° C.

In some embodiments, high-temperature pressing may be performed at a temperature 5-20° C. lower than a melting point of the organic binder. High-temperature pressing at such temperature can make the organic binder have fluidity to some extent in the pressing process, so as to implement tight bonding between the metal layer and the support layer. Optionally, high-temperature pressing may be performed at a pressure above 30 T. High-temperature pressing under such pressure can avoid generation of air bubbles in the interface layer, so as to implement tight bonding between the metal layer and the support layer. Such tight bonding can not only improve adhesion between the metal layer and the support layer, but also effectively prevent corrosive substances such as hydrofluoric acid from penetrating into the interface layer to achieve corrosion resistance in an electrolyte environment.

This application further provides a secondary battery, including a positive electrode, a negative electrode, an electrolyte, and a separator. At least one of the positive electrode and the negative electrode includes the foregoing current collector in this application.

This application further provides a battery module, including the foregoing secondary battery in this application.

This application further provides a battery pack, including the foregoing battery module in this application.

This application further provides an electric apparatus, including at least one of the foregoing secondary battery in this application, the foregoing battery module in this application, and the foregoing battery pack in this application.

In the current collector of this application, the binder layer including the organic binder and the inorganic particles is provided between the support layer and the metal layer of the current collector, and the thickness of the binder layer and the particle size of the inorganic particles are better matched. In this way, both the elastic modulus of the current collector and the adhesion of the current collector can be increased, thereby improving processing performance of the current collector and improving kinetic performance, safety performance, and long-term stability of the secondary battery using such current collector. The discharge internal resistance (DCR) of the current collector of this application is equivalent to a discharge internal resistance (DCR) of the metal layer, thereby effectively suppressing temperature increase during battery use and improving the cycle life and safety performance of the battery.

The following describes the secondary battery, the battery module, the battery pack, and the apparatus of this application with appropriate reference to the accompanying drawings.

An embodiment of this application provides a secondary battery.

Generally, the secondary battery includes a positive electrode plate, a negative electrode plate, an electrolyte, and a separator. During charge and discharge of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent short circuit between the positive and negative electrodes and to allow the ions to pass through.

[Positive Electrode Plate]

The positive electrode plate may include the current collector of this application used as a positive electrode current collector and a positive electrode film layer disposed on at least one surface of the positive electrode current collector. The positive electrode film layer includes a positive electrode active material, and the positive electrode active material includes, but is not limited to, lithium cobalt oxide, nickel lithium manganese cobaltate, lithium nickel manganese aluminate, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganate, spinel nickel manganate, lithium titanate, and the like. One or more of the foregoing materials may be used as the positive electrode active material.

For example, the positive electrode current collector includes two opposite surfaces in its thickness direction, and the positive electrode film layer is disposed on either or both of the two opposite surfaces of the positive electrode current collector.

The positive electrode film layer may optionally include a conductive agent. The conductive agent is not limited to a specific type, and may be selected by persons skilled in the art based on actual needs. For example, the conductive agent used in the positive electrode film layer may be selected from more than one of superconducting carbon, acetylene black, carbon black, Ketjen black, carbon dots, carbon nanotubes, graphene, and carbon nanofiber.

The positive electrode plate may be prepared by using a method known in the art. The positive electrode current collector used in the positive electrode plate may be prepared by using the preparation method of current collector in this application. For example, a positive electrode active material, a conductive agent, and a binder are dissolved in a solvent (for example, N-methylpyrrolidone (NMP)) to form a uniform positive electrode slurry; and the positive electrode slurry is applied on the current collector of this application used as a positive electrode current collector, followed by processes such as drying and cold pressing, to obtain a positive electrode plate.

[Negative Electrode Plate]

The negative electrode plate may include the current collector of this application used as a negative electrode current collector and a negative electrode film layer disposed on at least one surface of the negative electrode current collector, and the negative electrode film layer includes a negative electrode active material.

In the secondary battery of this application, the negative electrode active material may be a negative electrode active material commonly used in the art for preparing a negative electrode of a secondary battery. Examples of the negative electrode active material may be artificial graphite, natural graphite, soft carbon, hard carbon, silicon-based material, tin-based material, lithium titanate, and the like. The silicon-based material may be selected from one or more of elemental silicon, silicon-oxygen compound (such as silicon monoxide), silicon-carbon compound, silicon-nitrogen compound, and silicon alloy. The tin-based material may be selected from more than one of elemental tin, tin-oxygen compound, tin alloy, and the like.

For example, the negative electrode current collector includes two opposite surfaces in its thickness direction, and the negative electrode film layer is disposed on either or both of the two opposite surfaces of the negative electrode current collector.

In the secondary battery of this application, the negative electrode film layer usually includes the negative electrode active material, optionally a binder, optionally a conductive agent, and other optional additives, and is usually formed by applying a negative electrode slurry and performing drying. The negative electrode slurry is usually formed by dispersing a negative electrode active material, optionally a conductive agent, optionally a binder, and the like in a solvent and stirring them uniformly. The solvent may be N-methylpyrrolidone (NMP) or deionized water.

For example, the conductive agent may be selected from more than one of superconducting carbon, acetylene black, carbon black, Ketjen black, carbon dots, carbon nanotubes, graphene, and carbon nanofiber.

In an example, the binder may be selected from more than one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

The other optional additives are, for example, a thickener (for example, sodium carboxymethyl cellulose (CMC-Na)).

The negative electrode plate may be prepared by using a method known in the art. The negative electrode current collector used in the negative electrode plate may be prepared by using the preparation method of current collector in this application. For example, a negative electrode active material, a conductive agent, a binder, and any other components, are dissolved in a solvent (for example, deionized water) to form a uniform negative electrode slurry; and the negative electrode slurry is applied on the current collector of this application used as a negative electrode current collector, followed by processes such as drying and cold pressing, to obtain a negative electrode plate.

[Electrolyte]

The electrolyte conducts ions between the positive electrode plate and the negative electrode plate. The electrolyte is not specifically limited to any particular type, and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In an example, the electrolytic salt may be selected from one or more of lithium hexafluorophosphate (LiPF$_6$), lithium tetrafluoroborate (LiBF4), lithium perchlorate (LiClO$_4$), lithium hexafluoroborate (LiAsF$_6$), lithium bisfluorosulfonyl imide (LiFSI), lithium bis-trifluoromethanesulfon imide (LiTFSI), lithium trifluoromethanesulfonat (LiTFS), lithium difluorooxalatoborate (LiDFOB), lithium bisoxalatoborate (LiBOB), lithium difluorophosphate (LiPO$_2$F$_2$), lithium difluorophosphate (LiDFOP), and lithium tetrafluoro oxalate phosphate (LiTFOP).

In an example, the solvent may be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some embodiments, optionally, the electrolyte further includes an additive. For example, the electrolyte may include a negative electrode film-forming additive, a positive electrode film-forming additive, an additive for improving battery overcharge performance, an additive for improving battery high temperature performance, an additive for improving battery low temperature performance, and the like.

[Separator]

The separator isolates the positive electrode plate from the negative electrode plate, to prevent short circuits inside the battery and enable active ions to move between the positive electrode plate and the negative electrode plate through the separator. No particular limitation is imposed on a type of the separator in the secondary battery of this application, which may be any well-known porous separator with good chemical stability and mechanical stability.

In some embodiments, a material of the separator may be selected from one or more of a glass fiber film, a non-woven film, a polyethylene (PE) film, a polypropylene (PP) film, a polyvinylidene fluoride film, and a multilayer composite film including one or more of them. The separator may be a single-layer separator or a multi-layer composite separator, which is not particularly limited. When the separator is a multi-layer composite separator, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package may be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. As the plastic, polypropylene (PP), polybutylene terephthalate (PBT), and polybutylene succinate (PBS) may be listed.

Figure 3:
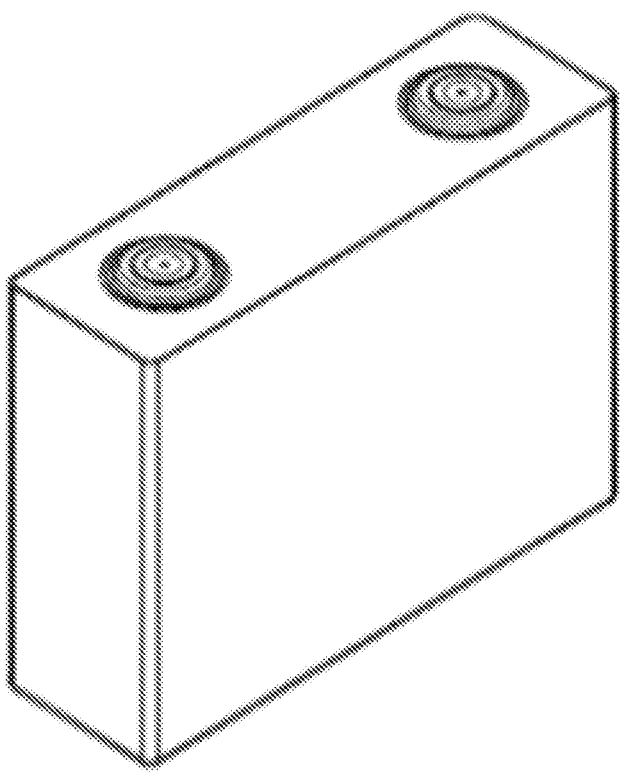
FIG. 3 is a schematic diagram of a secondary battery according to an embodiment of this application.

This application does not impose special limitations on a shape of the secondary battery, and the secondary battery may be cylindrical, rectangular, or of any other shapes. For example, FIG. 3 shows a secondary battery 5 of a rectangular structure as an example.

Figure 4:
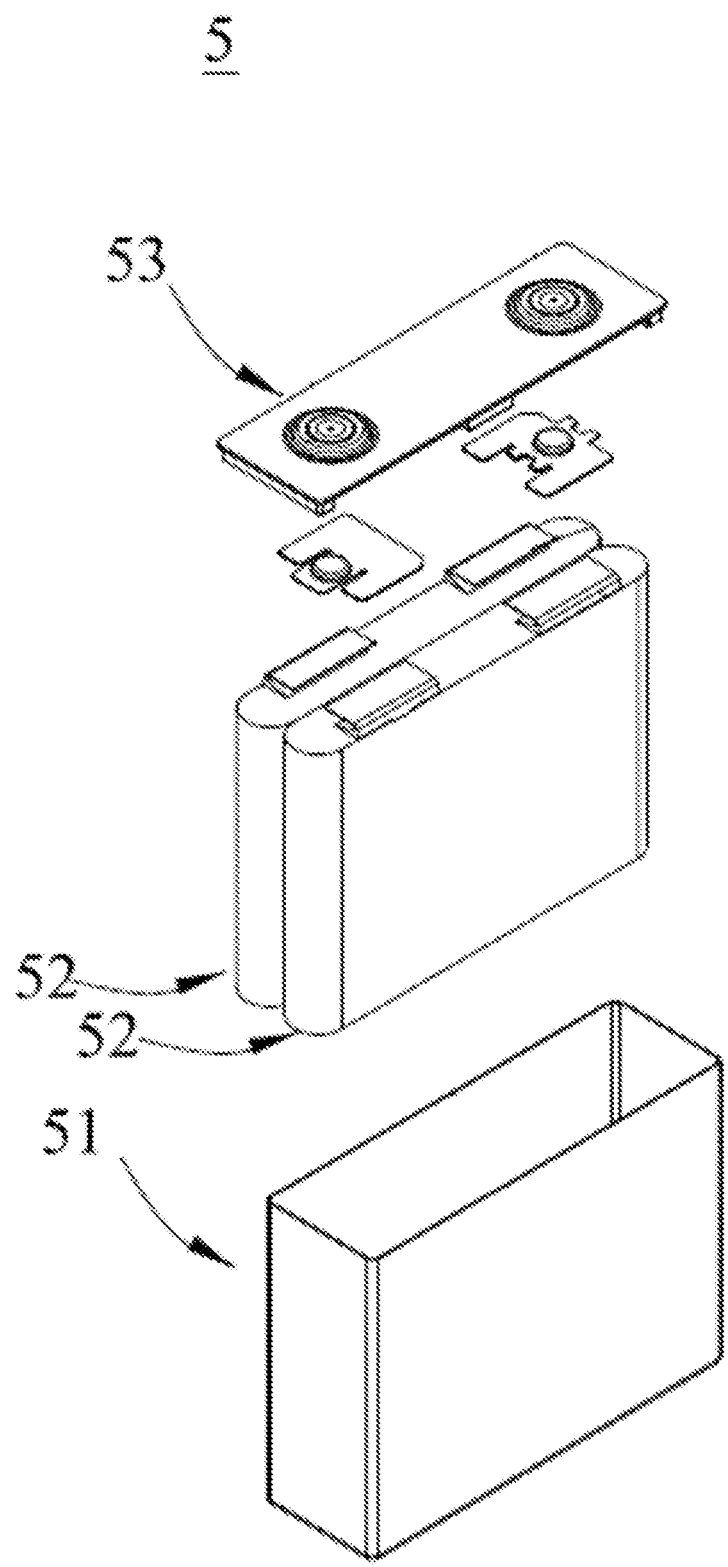
FIG. 4 is an exploded view of the secondary battery according to the embodiment of this application in FIG. 3.

In some embodiments, referring to FIG. 4, the outer package may include a housing 51 and a cover plate 53. The housing 51 may include a base plate and a side plate connected to the base plate, and the base plate and the side plate enclose an accommodating cavity. The housing 51 has an opening communicating with the accommodating cavity, and the cover plate 53 can cover the opening, to seal the accommodating cavity. A positive electrode plate, a negative electrode plate, and a separator may form an electrode assembly 52 through winding or lamination. The electrode assembly 52 is packaged in the accommodating cavity. The electrolyte is infiltrated into the electrode assembly 52. There may be one or more electrode assemblies 52 in the secondary battery 5, and persons skilled in the art may make choices according to actual requirements.

In some embodiments, secondary batteries may be assembled into a battery module, and the battery module may include one or more secondary batteries. A specific quantity may be chosen by persons skilled in the art based on use and capacity of the battery module.

Figure 5:
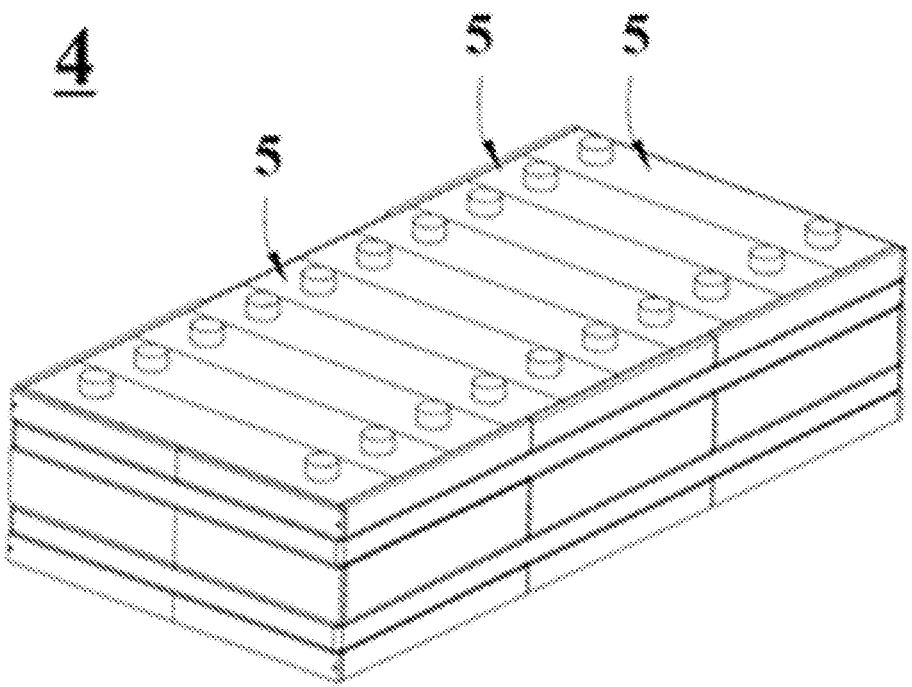
FIG. 5 is a schematic diagram of a battery module according to an embodiment of this application.

FIG. 5 shows a battery module 4 in an example. Referring to FIG. 5, in the battery module 4, a plurality of secondary batteries 5 may be sequentially arranged in a length direction of the battery module 4. Certainly, the cells may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, the battery modules may be further assembled into a battery pack, and a quantity of battery modules included in the battery pack may be chosen by persons skilled in the art based on use and capacity of the battery pack.

Figure 6:
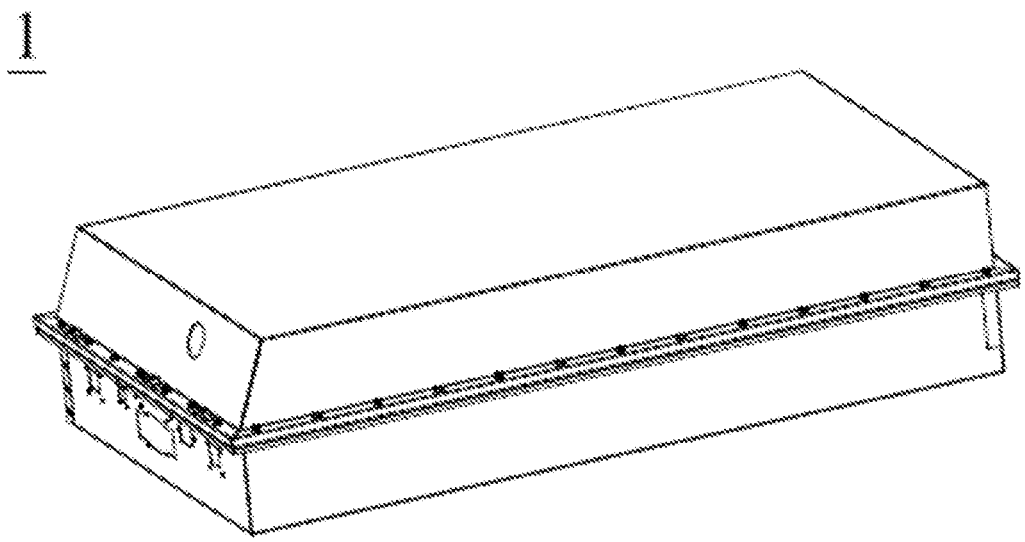
FIG. 6 is a schematic diagram of a battery pack according to an embodiment of this application.
Figure 7:
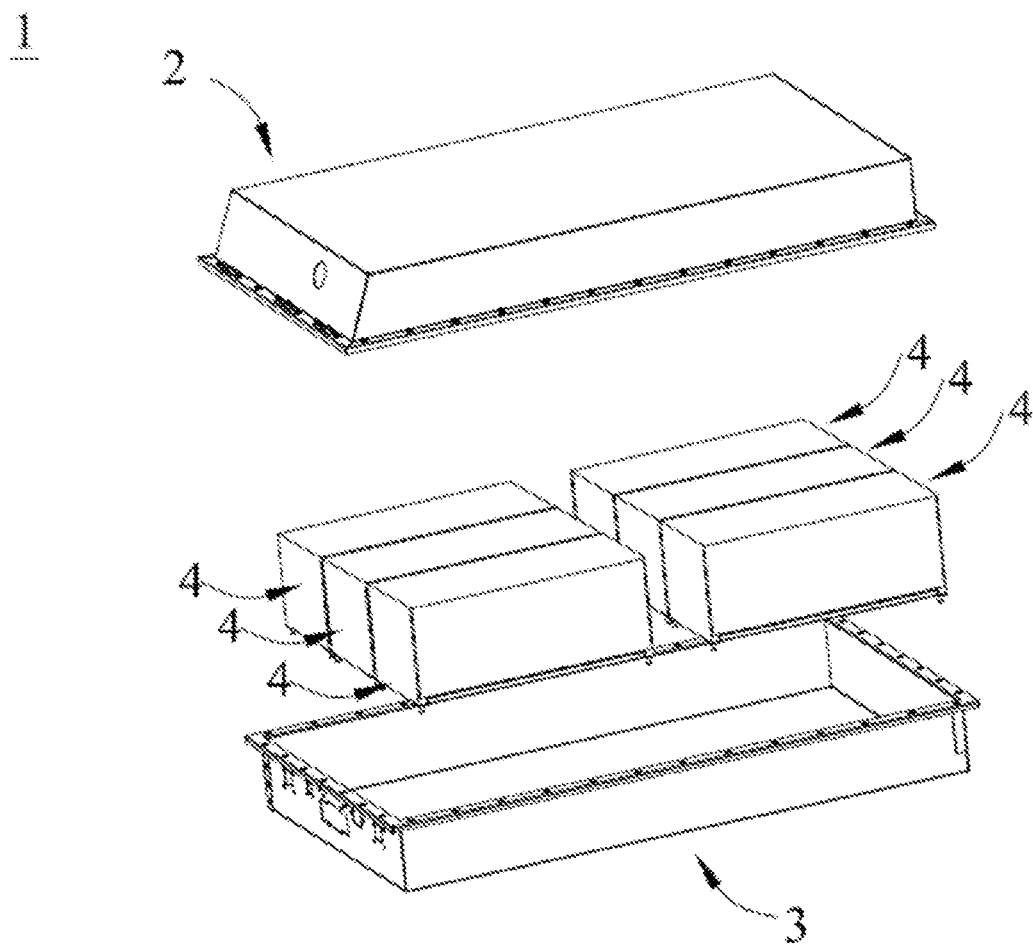
FIG. 7 is an exploded view of the battery pack according to the embodiment of this application in FIG. 6.

FIG. 6 and FIG. 7 show a battery pack 1 in an example. Referring to FIG. 6 and FIG. 7, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source of the electric apparatus or as an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

As an electric apparatus, a secondary battery, a battery module, or a battery pack may be selected according to requirements for using the electric apparatus.

Figure 8:
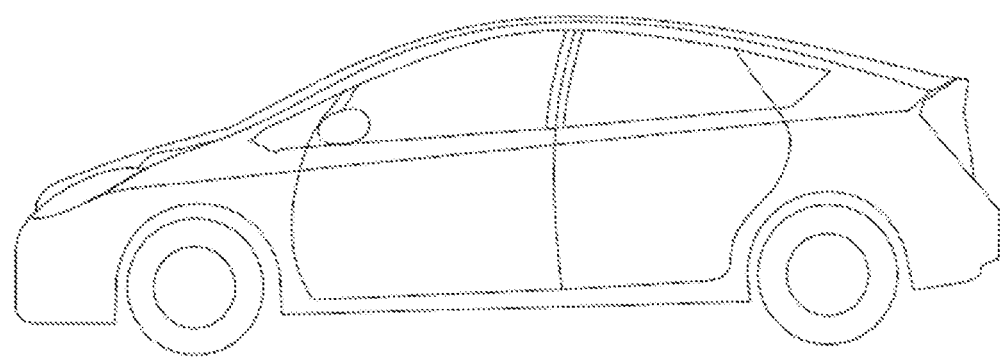
FIG. 8 is a schematic diagram of an electric apparatus using a secondary battery as a power source according to an embodiment of this application.

FIG. 8 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the electric apparatus may be a mobile phone, a tablet computer, a notebook computer, or the like. The electric apparatus is usually required to be light and thin, and the secondary battery may be used as a power source.

EXAMPLES

The following describes examples in this application. The examples described below are exemplary and merely used to explain this application, but cannot be construed as a limitation on this application. Examples whose technical solutions or conditions are not specified are made based on technical solutions or conditions described in documents in the art, or made based on the product specification. The reagents or instruments used are all conventional products commercially available if no manufacturer is indicated.

Preparation of Inorganic Particles

In the examples of this application, aluminum oxide particles were used as inorganic particles. Preparation of aluminum oxide particles having a specific median particle size $D_{50}$ might be implemented by using the following ordinary method.

Ordinary commercially available aluminum oxide particles were used as raw material, and ball milling and sieving were further performed. For particles larger than 1 μm, sieving was performed twice or more by using sieves to obtain particles of a target size. For example, in order to prepare particles with a median particle size $D_{50}$ of 1.5 μm, a 1.7 μm sieve might be used to remove particles larger than 1.7 μm, and then a 1.3 μm sieve might be used to remove particles smaller than 1.3 μm, so as to obtain particles with a median particle size $D_{50}$ of about 1.5 μm. Finally, the median particle size $D_{50}$ of the particles was determined by using a particle size analyzer (Malvern Master Size 3000).

For particles below 1 μm, sieving might be performed in a centrifugation manner to obtain particles of a target size. For example, a 1 μm sieve was first used to remove particles with a particle size of 1 μm or more, and then the resulting particles were sonicated in an aqueous solution to form a suspension, and then centrifugation was performed at a speed of <3000 r/min for 20 min. Sediment obtained through centrifugation was removed to obtain supernatant, and then the supernatant was centrifuged at a speed of >5000 r/min for 20 min. Supernatant resulting from centrifugation was removed, to obtain precipitate particles. A median particle size $D_{50}$ of the precipitate particles was measured using a particle size analyzer. If necessary, sieving was further performed in a centrifugation manner until small particles with a target median particle size $D_{50}$ were obtained. Finally, the median particle size $D_{50}$ of the particles was determined by using a particle size analyzer (Malvern Master, Size 3000).

Preparation of Current Collector

In the examples of this application, the current collector may be prepared by using the following ordinary method.

Large particles with a median particle size $D_{50large}$ and small particles with a median particle size $D_{50small}$ that were prepared by using the method described above were mixed at a specific ratio. Optionally, carbon nanotubes with a mass percentage of less than or equal to 15% relative to a total weight of a binder layer might be further added. The large particles, the small particles, and optionally the carbon nanotubes were mixed with polyurethane used as an organic binder and then were stirred evenly in a solvent, to obtain a slurry for forming a binder layer.

A support layer and an aluminum foil or copper foil used as a metal layer were respectively placed on two unwinding rollers of a compound machine. The prepared slurry was applied on the support layer to form a coating layer for forming a binder layer. The coating layer was pre-baked at a temperature of 50-90° C. A metal layer was provided on the pre-baked coating layer to form a laminate for forming a current collector. The compound machine ran at a speed of 10-80 m/min. The laminate was sent to a composite roller, and high-temperature pressing was performed at a temperature of 130-190° C. and a pressure of 30 T or more. The laminate pressed and wound using the composite roller was placed into a curing chamber and cured at a temperature of 55-70° C. to obtain a current collector with a binder layer provided between the support layer and the metal layer.

In the foregoing ordinary method, the pressing temperature may be adjusted based on a melting point of a material of the binder. Specifically, the pressing temperature, that is, the temperature of the composite roller, may be controlled at a temperature 5-20° C. lower than the melting point of the binder, preferably at a temperature 1-5° C. lower than the melting point of the binder.

If necessary, the foregoing steps were performed again on the other side of the support layer to implement bonding between the other side and the metal layer.

If necessary, the surface of the metal layer might be physically or chemically etched to make the metal layer thinner. Specifically, physical etching might include treatment on the current collector by using a plasma emitter, to make the metal layer thinner by using an etching function of the plasma. In physical etching, a reduced thickness of the metal layer might be adjusted depending on time and power of plasma etching. Chemical etching might include treatment on the current collector by using a chemical reaction method, more specifically, the metal layer was made thinner through reaction of a chemical solution such as acid or alkali on a surface of the current collector. In chemical etching, a reduced thickness of the metal layer might be controlled depending on time of chemical reaction and concentration of the chemical solution.

Preparation of Battery

In the examples of this application, at least one of the positive electrode and the negative electrode of the secondary battery included the current collector of this application. The secondary battery might be prepared by using the following ordinary method.

(1) Preparation of Positive Electrode Plate

Active materials $LiNi_{0.8}Co_{0.1}Mn_{0.1}O_2$ and $LiNi_{0.5}Co_{0.2}Mn_{0.3}O_2$ were mixed in a ratio of 17:3, and then were stirred fully along with a conductive agent acetylene black (Denka Black, manufactured by Nippon Denka Co., Ltd.) and a binder polyvinylidene fluoride (HSV 900 manufactured by Arkema Group) in an N-methylpyrrolidone solvent system at a weight ratio of 95:3:2, so as to uniformly mix to obtain a slurry with a solid content of 70%. The positive electrode slurry was uniformly applied, by using an extrusion coater or a transfer coater through a conventional process, on an aluminum foil or one side of the positive electrode current collector with a metal layer being an aluminum foil and prepared by using the foregoing method, following by drying at 85-110° C., cold pressing, trimming, cutting, and slitting, to obtain a positive electrode plate.

(2) Preparation of Negative Electrode Plate

A negative active material artificial graphite, a conductive agent Super P, a thickener sodium carboxymethyl cellulose (CMC), and a binder styrene-butadiene rubber emulsion (SBR) were mixed in a mass ratio of 97:0.7:1.8:0.5, and then were added into a solvent deionized water and stirred uniformly under action of a vacuum mixer to obtain a negative electrode slurry. The negative electrode slurry had a solid content of 56 wt %. The negative electrode slurry was uniformly applied, by using an extrusion coater or a transfer coater through a conventional process, on a copper foil or one side of the negative electrode current collector with a metal layer being a copper foil and prepared by using the foregoing method, following by drying at 85-110° C., cold pressing, trimming, cutting, and slitting, to obtain a negative electrode plate.

(3) Preparation of Electrolyte

In an argon atmosphere glove box with moisture content of <10 ppm, fully dry lithium salt (LiPF6) was dissolved in a mixed solvent that includes ethylene carbonate (EC), ethyl methyl carbonate (EMC), and diethyl carbonate (DEC) in a volume ratio of 20:20:60, an additive vinylene carbonate (VC) was then added, and the mixture was evenly mixed to obtain an electrolyte. A concentration of the lithium salt was 1 mol/L.

(4) Preparation of a Separator

A polyethylene film (PE) with a thickness of 9 μm was used as a base membrane of the separator, and aluminum oxide, sodium carboxymethylcellulose (CMC), and acrylate in a weight ratio of 93%:3%:4% were added to deionized water and stirred evenly under action of a vacuum mixer to obtain a slurry. Solid content of the slurry is 55%. The resulting slurry was uniformly applied on both sides of the base membrane, with a thickness of 2 μm on each side, and then PVDF was applied on one side to obtain a separator.

(5) Preparation of Lithium-Ion Battery

The positive electrode plate, the separator, and the negative electrode plate were stacked in sequence, so that the separator was sandwiched between the positive electrode plate and the negative electrode plate for isolation. Then, the resulting stack was made into a square bare core through winding, tabs are welded, the bare core was placed into a square aluminum case, and a top cover was laser welded. Then, after vacuum baking was performed at 80° C. to remove water, and the electrolyte was injected and sealed. After processes of standing at 45° C., forming (being charged at a constant current of 0.02 C to 3.3V, and then charged at a constant current of 0.1 C to 3.6V), shaping, and capacity testing, a finished hard-shell lithium-ion battery was obtained, with a thickness of 28 mm, a width of 97.5 mm, and a length of 148 mm.

Performance Test (1) Elastic Modulus

A current collector was punched into strips of 15 mm×150 mm by using a strip sampler, and the punched strip samples were tested using a tensile machine. An initial spacing of the tensile machine was 50 mm, and stretching was performed at a speed of 50 mm/min until the sample was broken. A linear stretch area before a yield point was fetched and a corresponding stress and strain were obtained, and then the elastic modulus was calculated according to the following formula:

$$\text{Elastic modulus}=\text{stress}/\text{strain}.$$

(2) Adhesion

A double-sided tape was attached to a smooth steel plate. The current collector was cut as wide as the double-sided tape and attached flat on a surface of the double-sided tape. Then, a surface tape was cut as wide as the current collector, and attached to a surface of the current collector, and an A4 paper strip with a length greater than that of the steel plate was connected at the head. A 2.5 kg roller was used to roll back and forth over the attached surface tape until the tape became flat. One end of the steel plate was fastened to the tensile machine (INSTRON, 3365), and the A4 paper connected to the surface tape was fastened on the other end of the tensile machine. The tape was peeled off at a speed of 500 mm/min, to obtain a peeling force curve, and an average peeling force was obtained through calculation and recorded as adhesion of the current collector.

(3) Cold-Pressing Elongation Rate

A coated electrode plate with a length greater than 1 m was fetched, with tabs removed. An initial length of the coated electrode plate was denoted as $L_0$, and then cold pressing was performed under a pressure of 30-60 T. A length of the electrode plate after cold pressing was $L_1$. A cold-pressing elongation rate was calculated according to the following formula: Cold-pressing elongation rate=$(L_1-L_0)/L_0 \times 100\%$.

(4) Arc Height of Cold-Pressed Electrode Plate

An arc-height plate with a length of 1 m was prepared, and a cold-pressed electrode plate with a length of more than 1 m was fetched. Tabs of the cold-pressed electrode plate were aligned with two edges of the arc-height plate, hanging down two sides, and a 50 g weight was separately hung on two sides with a clip. Then, a height (that is, a protrusion height of an arc top with respect to two sides) of a middle position relative to protrusion of the arc-height plate was measured, and was recorded as the arc height of the cold-pressed electrode plate.

(5) Number of Folds at the Root of Tabs after Cycling

A fresh battery was charged and discharged at 0.33 C at a room temperature of 25° C., and a capacity at that time was recorded as an initial capacity C. Cycling was performed by charging at a rate of 1 C and discharging at a rate of 1 C at 60° C. until the capacity decayed to 80% of the initial capacity. Then, an electrode plate was disassembled from the battery cell. The resulting electrode plate was placed flat on a table, and the number of folds with a length of >3 mm at the root of each tab was recorded. The number of folds with the length of >3 mm for more than 10 tabs was recorded, to obtain an average value, which was recorded as the number of folds at the root of the tabs after cycling.

(6) Number of Cycles

A fresh battery was charged and discharged at 0.33 C at a room temperature of 25° C., and a discharge capacity at that time was recorded as an initial capacity C. Cycling was performed by charging at a rate of 1 C and discharging at a rate of 1 C at 60° C. until the capacity decayed to 80% of the initial capacity, and then the corresponding number of cycles at that time was recorded.

(7) Discharge Internal Resistance (DCR)

A battery was adjusted to 50% SOC, and discharged at a rate of 4 C (corresponding to a discharge current of I) for 30 s, and a voltage difference $\Delta V$ before and after 30 s discharge was recorded. A DCR corresponding to 50% SOC was then calculated according to the following formula:

DCR=$\Delta V/I$.

(8) Discharge Capacity Retention Rate at 2 C

A fresh battery was fully charged at a rate of 0.33 C at a room temperature of 25° C. and then discharged, and a discharge capacity at that time was recorded as an initial capacity $C_0$. Then, the battery was discharged at a rate of 2 C at a room temperature of 25° C., and a discharge capacity at that time was recorded as $C_1$. A capacity retention rate was calculated according to the following formula:

Capacity retention rate=$C_1/C_0 \times 100\%$ (9) Number of Burrs on Cutting End Face A current collector coil with a length of about 3000 m was fetched and cut at a speed of 15 m/min, and then a tape about 12 cm long was used to attach to all positions on the end face, and then the tape was fastened to a glass slide. A surface of the tape was observed under a microscope, and the number of burrs longer than 200 μm was collected through statistics.

Example 1

Large particles (80% by mass) with a median particle size $D_{50large}$ of 1500 nm that were prepared by using the method described above were mixed with small particles (20% by mass) with a median particle size $D_{50small}$ of 500 nm to obtain inorganic particles for preparing a binder layer. The inorganic particles (70% by mass) were mixed with an organic binder being polyurethane (30% by mass), and the mixture was uniformly stirred in a solvent N-methylpyrrolidone (NMP), to obtain a slurry for forming a binder layer.

The resulting slurry was applied on one surface of a support layer being polyethylene terephthalate (PET) (with a thickness of 4.5 μm), to form a coating layer for forming a binder layer. The coating layer was pre-baked at a temperature of about 60° C. A metal layer being an aluminum foil (with a thickness of 5 μm) was provided on the pre-baked coating layer to form a laminate for forming a current collector. A compound machine ran at a speed of about 20 m/min. The laminate was sent to a composite roller, and high-temperature pressing was performed at a temperature of about 150° C. and a pressure of about 50 T. The laminate pressed and wound using the composite roller was placed into a curing chamber and cured at a temperature of 60° C. The foregoing steps were performed again on the other surface of the support layer and the metal layer to obtain a current collector with a binder layer provided between the support layer and the metal layer. The resulting composite current collector passed through an alkali reaction etching tank containing NaOH solution, to make the metal layer thinner to a thickness of about 2 μm, and then was washed with water and dried with hot air.

The current collector was used as a positive electrode current collector, to further prepare a positive electrode plate and a secondary battery.

In this example, a thickness $D_0$ of the binder layer of the current collector was 2.0 μm. Inorganic particles in the binder layer included large particles and small particles. A median particle size $D_{50large}$ of the large particles satisfied the following relationship: $D_{50large}=0.75 \times D_0$; and a median particle size $D_{50small}$ of the small particles satisfied the following relationship: $D_{50small}=0.25 \times D_0$. Based on a total mass of the binder layer, a mass percentage of the inorganic particles was 70 wt %. Based on a total mass of the inorganic particles, a mass percentage of the large particles is 80 wt %, and a mass percentage of the small particles is 20 wt %.

Examples 2 to 5 and Comparative Examples 1 and 2

Current collectors, positive electrode plates, and secondary batteries were prepared by using substantially the same method as those in Example 1, except for thickness of binder layers of the current collectors, as shown in Table 1.

Table 1 also lists elastic modulus of current collector, adhesion, cold-pressing elongation rate, arc height of cold-pressed electrode plate, the number of folds at the root of tabs after cycling, the number of cycles, DCR, and discharge capacity retention rate at 2 C in Examples 1 to 5 and Comparative Examples 1 and 2.

TABLE 1

| Number | $D_0$ (μm) | Elastic modulus (MPa) | Adhesion (N/m) | Cold-pressing elongation rate | Arc height of cold-pressed electrode plate | Number of folds | Number of cycles | DCR (mΩ) | Discharge capacity retention rate at 2 C |
|---|---|---|---|---|---|---|---|---|---|
| Example 1 | 2.0 | 9112 | 316 | 0.95% | 2.0 | 0 | 487 | 1.50 | 95.2% |
| Example 2 | 1.0 | 8503 | 314 | 1.20% | 4.0 | 0 | 460 | 1.54 | 92.9% |
| Example 3 | 3.0 | 8821 | 312 | 1.10% | 3.0 | 0 | 473 | 1.50 | 94.1% |
| Example 4 | 4.0 | 8715 | 311 | 1.15% | 3.5 | 0 | 468 | 1.50 | 93.6% |
| Example 5 | 5.0 | 8511 | 310 | 1.20% | 4.0 | 0 | 461 | 1.54 | 92.9% |
| Comparative Example 1 | 0.8 | 6735 | 311 | 1.65% | 8.5 | 4 | 430 | 1.70 | 89.8% |
| Comparative Example 2 | 5.2 | 7025 | 313 | 1.55% | 8.0 | 3 | 440 | 1.64 | 90.6% |

In Comparative Example 1, the thickness $D_0$ of the binder layer was 0.8 μm. In Comparative Example 2, the thickness $D_0$ of the binder layer was 5.2 μm. Compared with Examples 1 to 5 in which the thickness of the binder layers was in a range of 1.0 to 5.0 μm, the current collectors in Comparative Examples 1 and 2 had significantly decreased elastic modulus values although the adhesion remained at a relatively high level. As a result, the cold-pressing elongation rate of the electrode plate was excessively high, and the arc height of the cold-pressed electrode plate reached up to 8.0 mm/m or above. In addition, the number of cycles for the batteries was reduced, and the electrode plates after cycling were significantly wrinkled, and the number of folds with a length of >3 mm at the root of the tab was relatively large. Also, the discharge internal resistance (DCR) of the batteries was increased, and the discharge capacity retention rate at 2 C was decreased. The reason may be that when the thickness of the binder layer is excessively small, it is difficult to apply the binder layer on the support layer uniformly; when the thickness of the binder layer is excessively large, sedimentation of inorganic particles and uneven distribution of particles easily occur during applying of the binder layer. In both cases, the elastic modulus of the current collector is adversely affected.

Examples 6 to 11 and Comparative Example 3

In Examples 6 to 11, current collectors, positive electrode plates, and secondary batteries were prepared by using substantially the same method as those in Example 1, except for mass percentage of inorganic particles based on total weight of a binder layer, as shown in Table 2.

In Comparative Example 3, no inorganic particles were added to the binder layer.

Table 2 also lists elastic modulus of current collector, adhesion, cold-pressing elongation rate, arc height of cold-pressed electrode plate, the number of folds at the root of tabs after cycling, the number of cycles, DCR, and discharge capacity retention rate at 2 C in Examples 6 to 11 and Comparative Example 3.

TABLE 2

| Number | Mass percentage of inorganic particles | Elastic modulus (MPa) | Adhesion (N/m) | Cold-pressing elongation rate | Arc height of cold-pressed electrode plate (mm/m) | Number of folds | Number of cycles | DCR (mΩ) | Discharge capacity retention rate at 2 C |
|---|---|---|---|---|---|---|---|---|---|
| Example 6 | 50% | 8214 | 368 | 1.25% | 4.5 | 0 | 451 | 1.57 | 91.1% |
| Example 7 | 60% | 8557 | 361 | 1.20% | 4.0 | 0 | 462 | 1.54 | 93.0% |
| Example 8 | 80% | 8750 | 349 | 1.15% | 3.5 | 0 | 469 | 1.50 | 93.7% |
| Example 9 | 85% | 8825 | 336 | 1.10% | 3.0 | 0 | 473 | 1.50 | 94.1% |
| Example 10 | 48% | 6785 | 369 | 1.65% | 8.5 | 4 | 431 | 1.70 | 89.8% |
| Example 11 | 87% | 7123 | 265 | 1.50% | 7.5 | 2 | 443 | 2.04 | 86.5% |
| Comparative Example 3 | 0% | 2313 | 379 | 2.10% | 9.5 | 6 | 370 | 1.85 | 87.6% |

Because no inorganic particles for increasing elastic modulus were included in the binder layer in Comparative Example 3, compared with Examples 6 to 11 in which inorganic particles were included, the elastic modulus of the current collector was decreased sharply, resulting in a cold-pressing elongation rate up to 2.10% and an arc height of cold-pressed electrode plate up to 9.5 mm/m. In addition, the number of cycles for the batteries was significantly reduced, and the electrode plates after cycling were significantly wrinkled, and the number of folds with a length of >3 mm at the root of the tab was relatively large.

Figure 2:
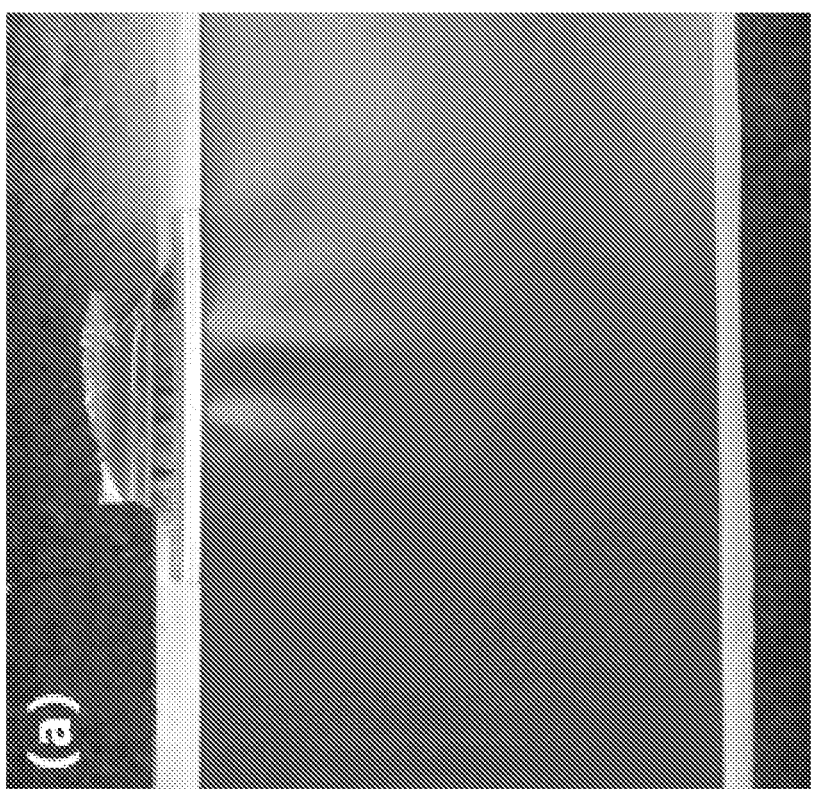
FIG. 2 is a photograph of an electrode plate obtained by disassembling a secondary battery after cycling in Comparative Example 3(a) and Example 7(b).
Figure 2:
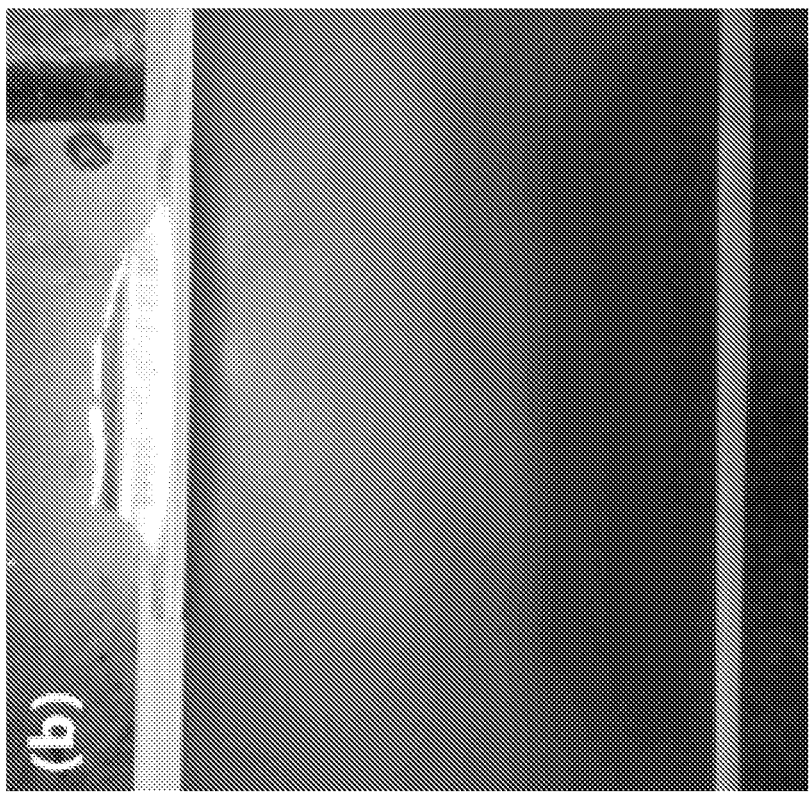

In an example, FIG. 2 is a photograph of an electrode plate obtained by disassembling a secondary battery after cycling in Comparative Example 3(a) and Example 7(b). As shown in FIG. 2(a), in Comparative Example 3, the electrode plate was obviously wrinkled. As shown in FIG. 2(b), in Example 7, the electrode plate after cycling was not wrinkled. FIG. 2 clearly illustrates that, with the inorganic particles including large particles and small particles added to the binder layer, the current collector of this application applied to the secondary battery can resolve the problems of deformation and wrinkling of electrode plate that are present in the prior-art secondary battery during cycling.

In Examples 6 to 9, a mass percentage of the inorganic particles was in a preferred range of 50 wt % to 85 wt %. Compared with Examples 10 and 11, an effect of increasing the elastic modulus was further improved, resulting in a further decrease in the cold-pressing elongation rate of the electrode plate and a further decrease in the arc height of the cold-pressed electrode plate. In addition, the discharge capacity retention rate at 2 C of the battery was further increased.

Examples 12 to 15 and Comparative Examples 4 to 7

Current collectors, positive electrode plates, and secondary batteries were prepared by using substantially the same method as those in Example 1, except for a ratio of the median particle size $D_{50large}$ of the large particles to the thicknesses $D_0$ of the binder layer and a ratio of the median particle size $D_{50small}$ of the small particles to the thicknesses $D_0$ of the binder layer, as shown in Table 3.

Table 3 also lists elastic modulus of current collector, adhesion, cold-pressing elongation rate, arc height of cold-pressed electrode plate, the number of folds at the root of tabs after cycling, the number of cycles, DCR, and discharge capacity retention rate at 2 C in Examples 12 to 15 and Comparative Examples 4 to 7.

TABLE 3

| Number | $D_{50large}$ (nm)/ $D_{50large}/D_0$ | $D_{50small}$ (nm)/ $D_{50small}/D_0$ | Elastic modulus (MPa) | Adhesion (N/m) | Cold-pressing elongation rate | Arc height of cold-pressed electrode plate (mm/m) | Number of folds | Number of cycles | DCR (mΩ) | Discharge capacity retention rate at 2 C |
|---|---|---|---|---|---|---|---|---|---|---|
| Example 12 | 1000/0.5 | 500/0.25 | 8565 | 360 | 1.20% | 4.0 | 0 | 462 | 1.54 | 93.0% |
| Example 13 | 1800/0.9 | 500/0.25 | 8907 | 359 | 1.05% | 2.5 | 0 | 477 | 1.50 | 94.6% |
| Comparative Example 4 | 900/0.45 | 500/0.25 | 6747 | 357 | 1.65% | 8.5 | 4 | 431 | 1.70 | 89.8% |
| Comparative Example 5 | 1900/0.95 | 500/0.25 | 7127 | 355 | 1.50% | 7.5 | 2 | 443 | 1.61 | 91.0% |
| Example 14 | 1500/0.75 | 200/0.1 | 8873 | 358 | 1.10% | 3.0 | 0 | 473 | 1.50 | 94.1% |
| Example 15 | 1500/0.75 | 800/0.4 | 8756 | 360 | 1.15% | 3.5 | 0 | 469 | 1.50 | 93.7% |
| Comparative Example 6 | 1500/0.75 | 150/0.05 | 7091 | 362 | 1.55% | 8.0 | 3 | 441 | 1.64 | 90.7% |
| Comparative Example 7 | 1500/0.75 | 1000/0.5 | 7126 | 359 | 1.50% | 7.5 | 2 | 443 | 1.61 | 91.0% |

In Comparative Example 4, the ratio of the median particle size $D_{50large}$ of the large particles to the thicknesses DO of the binder layer was 0.45. In Comparative Example 5, the ratio of the median particle size $D_{50large}$ of the large particles to the thicknesses DO of the binder layer was 0.95. Compared with Examples 12 and 13 in which the ratio of the median particle size $D_{50large}$ of the large particles to the thicknesses DO of the binder layer satisfied $D_{50large}=(0.5-0.9)\times D_0$, the current collectors in Comparative Examples 4 and 5 had significantly decreased elastic modulus values although the adhesion remained at a relatively high level. As a result, the cold-pressing elongation rate of the electrode plate was excessively high, and the arc height of the cold-pressed electrode plate reached up to 7.5 mm/m or above. In addition, the number of cycles for the batteries was reduced, and after cycling, the number of folds with a length of >3 mm at the root of the tab was relatively large. Also, the discharge capacity retention rate at 2 C of the battery was decreased. The reason may be that when the size of the large particles is excessively large, the inorganic particles are not likely to be uniformly dispersed in the binder layer; and when the size of the large particles is excessively small, it is difficult to suppress slippage between particles in the binder layer. In both cases, the elastic modulus of the current collector is adversely affected.

In Comparative Example 6, the ratio of the median particle size $D_{50small}$ of the small particles to the thicknesses $D_0$ of the binder layer was 0.05. In Comparative Example 7, the ratio of the median particle size $D_{50small}$ of the small particles to the thicknesses $D_0$ of the binder layer was 0.5. Compared with Examples 14 and 15 in which the ratio of the median particle size $D_{50small}$ of the small particles to the thicknesses $D_0$ of the binder layer satisfied $D_{50small}=(0.1-0.4)\times D_0$, the current collectors in Comparative Examples 6 and 7 had significantly decreased elastic modulus values although the adhesion remained at a relatively high level. As a result, the cold-pressing elongation rate of the electrode plate was excessively high, and the arc height of the cold-pressed electrode plate reached up to 7.5 mm/m or above. In addition, the number of cycles for the batteries was reduced, and after cycling, the number of folds with a length of >3 mm at the root of the tab was relatively large. Also, the discharge capacity retention rate at 2 C of the battery was decreased. The reason may be that when the size of the small particles is excessively large, it is difficult to adequately fill voids between the large particles; and when the size of the small particles is excessively small, the binder layer is prone to slippage between particles. In both cases, the elastic modulus of the current collector is adversely affected.

Examples 16 to 19

Current collectors, positive electrode plates, and secondary batteries were prepared by using substantially the same method as those in Example 1, except for a mass percentage of large particles in a total mass of inorganic particles and a mass percentage of small particles in a total mass of inorganic particles, as shown in Table 4.

Table 4 also lists elastic modulus of current collector, adhesion, cold-pressing elongation rate, arc height of cold-pressed electrode plate, the number of folds at the root of tabs after cycling, the number of cycles, DCR, and discharge capacity retention rate at 2 C in Examples 16 to 19.

TABLE 4

| Number | Mass percentage of large particles | Mass percentage of small particles | Elastic modulus (MPa) | Adhesion (N/m) | Cold-pressing elongation rate | Arc height of cold-pressed electrode plate (nm/m) | Number of folds | Number of cycles | DCR (mΩ) | Discharge capacity retention rate at 2 C |
|---|---|---|---|---|---|---|---|---|---|---|
| Example 16 | 70% | 30% | 8918 | 363 | 1.05% | 2.5 | 0 | 477 | 1.50 | 94.7% |
| Example 17 | 90% | 10% | 8737 | 361 | 1.15% | 3.5 | 0 | 469 | 1.50 | 93.7 |
| Example 18 | 60% | 40% | 7006 | 357 | 1.55% | 8.0 | 3 | 440 | 1.64 | 90.6% |
| Example 19 | 95% | 5% | 7151 | 356 | 1.50% | 7.5 | 2 | 443 | 1.61 | 91.0% |

In Examples 16 and 17, the mass percentage of the large particles is preferably in a range of 70 wt % to 90 wt %, and the mass percentage of the small particles is preferably in a range of 10 wt % to 30 wt %. Compared with Examples 18 and 19, an effect of increasing the elastic modulus was further improved, resulting in a further decrease in the cold-pressing elongation rate of the electrode plate and a further decrease in the arc height of the cold-pressed electrode plate. In addition, the number of cycles for the batteries was increased, and after cycling, no folds with a length of >3 mm were present at the root of the tabs. Also, the discharge internal resistance (DCR) of the batteries was decreased, and the discharge capacity retention rate at 2 C was further increased.

Examples 20 to 22 and Comparative Example 8

Current collectors, positive electrode plates, and secondary batteries were prepared by using substantially the same method as those in Example 1, except for carbon nanotubes being further added to the binder layer, with a mass percentage of carbon nanotubes shown in Table 5.

Table 5 also lists elastic modulus of current collector, adhesion, cold-pressing elongation rate, arc height of cold-pressed electrode plate, the number of folds at the root of tabs after cycling, the number of cycles, DCR, and discharge capacity retention rate at 2 C in Examples 20 to 22 and Comparative Example 8.

TABLE 5

| Number | Mass percentage of carbon nanotubes | Elastic modulus (MPa) | Adhesion (N/m) | Cold-pressing elongation rate | Arc height of cold-pressed electrode plate (nm/m) | Number of folds | Number of cycles | DCR (mΩ) | Discharge capacity retention rate at 2 C |
|---|---|---|---|---|---|---|---|---|---|
| Example 20 | 5.0% | 9281 | 359 | 0.90% | 1.5 | 0 | 493 | 1.50 | 95.5% |
| Example 21 | 10.0% | 9365 | 337 | 0.80% | 1.0 | 0 | 495 | 1.50 | 95.8% |
| Example 22 | 7.5% | 9521 | 347 | 0.80% | 1.0 | 0 | 500 | 1.50 | 96.0% |
| Comparative Example 8 | 15.0% | 8195 | 251 | 1.30% | 5.5 | 0 | 480 | 2.13 | 86.1% |

In Examples 20 to 22, the binder layer further included carbon nanotubes with a mass percentage of less than or equal to 10%. Compared with Example 1 in which no carbon nanotubes were added, the elastic modulus was further increased, resulting in a further decrease in the cold-pressing elongation rate of the electrode plate and a further decrease in the arc height of the cold-pressed electrode plate. In addition, the number of cycles of the battery was increased, and the discharge capacity retention rate at 2 C of the battery was further increased. The reason may be that the carbon nanotubes can further fill voids between the inorganic particles, thereby further increasing the elastic modulus of the current collector.

In Comparative Example 8, the mass percentage of carbon nanotubes was 15.0%. It can be seen that the elastic modulus of the current collector did not keep increasing along with increasing carbon nanotubes and the adhesion was decreased.

Examples 23 to 27 and Comparative Example 9

Current collectors were prepared by using substantially the same method as those in Example 1, except for a copper foil with a thickness of 1.5 μm being used as a metal layer and a thickness $D_0$ of a binder layer shown in Table 6. In Preparation Examples 23 to 27, the current collectors were used to prepare negative electrode plates and secondary batteries.

For comparison, in Comparative Example 9, no inorganic particles were added to the binder layer.

Table 6 also lists elastic modulus of current collector, adhesion, cold-pressing elongation rate, arc height of cold-pressed electrode plate, the number of folds at the root of tabs after cycling, the number of cycles, DCR, and discharge capacity retention rate at 2 C in Examples 23 to 27 and Comparative Example 9.

TABLE 6

| Number | $D_0$ (μm) | Elastic modulus (MPa) | Adhesion (N/m) | Cold-pressing elongation rate | Arc height of cold-pressed electrode plate (nm/m) | Number of folds | Number of cycles | DCR (mΩ) | Discharge capacity retention rate at 2 C |
|---|---|---|---|---|---|---|---|---|---|
| Example 23 | 2.0 | 12830 | 361 | 0.20% | 0.2 | 0 | 487 | 1.48 | 95.5% |
| Example 24 | 1.0 | 12325 | 353 | 0.30% | 0.2 | 0 | 484 | 1.49 | 95.3% |
| Example 25 | 3.0 | 12668 | 359 | 0.20% | 0.2 | 0 | 485 | 1.48 | 95.5% |
| Example 26 | 4.0 | 12173 | 357 | 0.30% | 0.2 | 0 | 484 | 1.49 | 95.3% |
| Example 27 | 5.0 | 11932 | 354 | 0.35% | 0.2 | 0 | 481 | 1.50 | 95.0% |
| Comparative Example 9 | 2.0 | 3215 | 368 | 0.90% | 3.5 | 2 | 442 | 1.66 | 91.2% |

It can be seen that excellent effects of the present invention could be implemented when the current collector of this application was used as the negative electrode current collector of the secondary battery. Compared with Comparative Example 9 in which no inorganic particles were included in the binder layer, the copper foil was used as the metal layer to prepare the current collector of this application, and the elastic modulus was very significantly increased, resulting in a significant decrease in the cold-pressing elongation rate of the electrode plate and a significant decrease in the arc height of the cold-pressed electrode plate. In addition, the number of cycles for the battery using such current collector was increased, and after cycling, no folds with a length of >3 mm were present at the root of the tabs. Also, the discharge internal resistance (DCR) of the batteries was decreased, and the discharge capacity retention rate at 2 C was increased.

Preparation Examples 1 to 3 and Preparation Comparative Examples 1 to 4

Current collectors, positive electrode plates, and secondary batteries were prepared by using substantially the same method as those in Example 1, except for temperature of high-temperature pressing during preparation of the current collectors, as shown in Table 7.

Table 7 lists the number of burrs on cutting end faces and adhesion of the current collectors in Preparation Examples 1 to 3 and Preparation Comparative Examples 1 to 4.

Under condition of a liquid injection coefficient of about 126 g/Ah, the current collectors were soaked for 7 days in an electrolyte that includes 1 mol/L LiPF$_6$, ethylene carbonate (EC), diethyl carbonate (DEC), ethyl methyl carbonate (EMC) (at a volume ratio of 20:20:60), and vinylene carbonate (VC), and then the adhesion was measured again. The adhesion after 7 days of soaking in the electrolyte was also shown in Table 7.

Cycling was performed by charging the batteries at a rate of 1 C and discharging the batteries at a rate of 1 C at 60° C. until a capacity decayed to 80% of an initial capacity or a voltage abruptly dropped to 0V, and the number of cells with internal short circuit in every 10 cells was recorded. After the batteries were stored at 60° C. for 60 days, the DCR was measured again, and a DCR growth rate relative to an initial time was calculated. Both the number of cells with internal short circuit and the DCR growth rate are shown in Table 7.

TABLE 7

| | Pressing temperature (° C.) | Number of burrs (pcs/ 1000 m) | Number of cells with internal short circuit after cycling at 60° C. (pcs/ 10 pcs) | Adhesion (N/m) | Adhesion after soaking in electrolyte for 7 days (N/m) | DCR growth rate after storage at 60° C. for 60 days |
|---|---|---|---|---|---|---|
| Preparation Example 1 | 150 | 0 | 0 | 351 | 347 | 1.1% |
| Preparation Example 2 | 160 | 0 | 0 | 356 | 352 | 1.0% |
| Preparation Example 3 | 165 | 0 | 0 | 360 | 358 | 1.0% |
| Preparation Comparative Example 1 | 50 | 15 | 7 | 105 | Peeling | 25.4% |
| Preparation Comparative Example 2 | 90 | 10 | 6 | 173 | 101 | 9.3% |
| Preparation Comparative Example 3 | 120 | 5 | 5 | 230 | 168 | 5.2% |
| Preparation Comparative Example 4 | 140 | 3 | 4 | 271 | 212 | 3.2% |

In Preparation Examples 1 to 3, during preparation of the current collectors, high-temperature pressing was performed at a temperature 5-20° C. lower than a melting point (° C.) of a binder. The prepared current collectors had excellent processing performance, and no burrs with a length of >200 μm were generated on cutting end faces. Moreover, the adhesion of the current collectors could be maintained at a sufficiently high level even after long-term soaking in the electrolyte. The secondary batteries using such current collectors had excellent long-term stability, free of internal short circuits after long-term cycling, and had an extremely low DCR growth rate after long-term storage at high temperature. In comparison, in the Preparation Comparative Examples 1 to 4, temperature of high-temperature pressing was not high enough, and a large number of burrs with a length of >200 μm were generated on the end faces during cutting of the prepared current collectors, featuring poor processing performance. The adhesion of the current collectors was also poor, and was further decreased after soaking in the electrolyte for 7 days, and even peeling occurred. The secondary batteries using such current collectors had poor long-term stability, with a considerable proportion of internal short circuits after long-term cycling and a significant increased DCR after long-term storage at high temperature. The reason may be that, in Preparation Comparative Examples 1 to 4, the pressing temperature is not high enough to make the binder have fluidity to some extent, resulting in insufficient adhesion between the metal layer and the support layer; therefore, it is difficult to prevent corrosive substances such as hydrofluoride in the electrolyte from penetrating into the interface layer, leading to proneness to internal short circuits and significant deterioration of long-term stability.

It should be noted that this application is not limited to the foregoing examples. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

INDUSTRIAL APPLICABILITY

The current collector of this application has both increased elastic modulus and increased adhesion, which resolves the problems of wrinkling of electrode plate, arcing, and strip breakage during cold pressing of the current collector, thereby improving processing performance of the current collector and significantly improving safety performance and long-term stability of batteries when the current collector is applied to secondary batteries. Therefore, this application is industrially applicable.

What is claimed is:

1. A current collector, comprising:
   a support layer;
   a binder layer; and
   a metal layer, wherein
   the binder layer is arranged between the support layer and the metal layer;
   the binder layer comprises an organic binder and inorganic particles;
   a thickness $D_0$ of the binder layer is 1.0-5.0 μm; and
   the inorganic particles comprise large particles with a median particle size $D_{50large}$ and small particles with a median particle size $D_{50small}$, and the median particle sizes of the large particles and the small particles satisfy the following relationships:

$D_{50large} > D_{50small}$;

$D_{50large} = (0.5-0.9) \times D_0$; and $D_{50small} = (0.1-0.4) \times D_0$.

2. The current collector according to claim 1, wherein based on a total mass of the binder layer, a mass percentage of the inorganic particles is 50 wt % to 85 wt %.

3. The current collector according to claim 1, wherein based on a total mass of the inorganic particles, a mass percentage of the large particles is 70 wt % to 90 wt % and the mass percentage of the small particles is 10 wt % to 30 wt %.

4. The current collector according to claim 1, wherein the median particle size $D_{50large}$ of the large particles is greater than 700-4500 nm; and/or, the median particle size $D_{50small}$ of the small particles is 100-2000 nm.

5. The current collector according to claim 1, wherein the binder layer further comprises carbon nanotubes.

6. The current collector according to claim 5, wherein, relative to the total mass of the binder layer, a mass percentage of the carbon nanotubes is less than or equal to 10%.

7. The current collector according to claim 1, wherein the inorganic particles are selected from one or more of aluminum oxide, silicon carbide, silicon nitride, silicon oxide, calcium oxide, boehmite, titanium dioxide, zirconium dioxide, magnesium oxide, zinc oxide, barium sulfate, and boron carbide.

8. The current collector according to claim 1, wherein the support layer comprises one or more of polyamide, polyimide, polyethylene glycol terephthalate, polybutylene terephthalate, polyethylene naphthalate, polycarbonate, polyethylene, polypropylene, polypropylene ethylene, acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene oxide, polyphenylene sulfide, polyethylene glycol, polythiaxyl, polyphenyl, polypyrrole, polyaniline, polythiophene, polypyridine, cellulose, starch, protein, epoxy resin, phenolic resin, derivatives thereof, crosslinked products thereof, and copolymers thereof.

9. The current collector according to claim 1, wherein the organic binder is selected from one or more of polypropylene, carboxymethyl cellulose, polyacrylate, styrene-butadiene rubber, polyacrylic acid sodium, polyurethane, polyethyleneimine, polyvinylidene fluoride, neoprene, nitrile rubber, silicone rubber, polyvinyl acetate, urea-formaldehyde resin, phenolic resin, epoxy resin, silane coupling agent, titanate coupling agent, zirconium coupling agent, aluminate coupling agent, and borate coupling agent.

10. The current collector according to claim 1, wherein the metal layer is an aluminum foil or a copper foil.

11. A secondary battery, comprising:
    a positive electrode;
    a negative electrode;
    an electrolyte; and
    a separator, wherein
    at least one of the positive electrode and the negative electrode comprises the current collector according to claim 1.

12. A battery module, comprising the secondary battery according to claim 11.

13. A battery pack, comprising the battery module according to claim 12.

* * * * *